Figure 1:
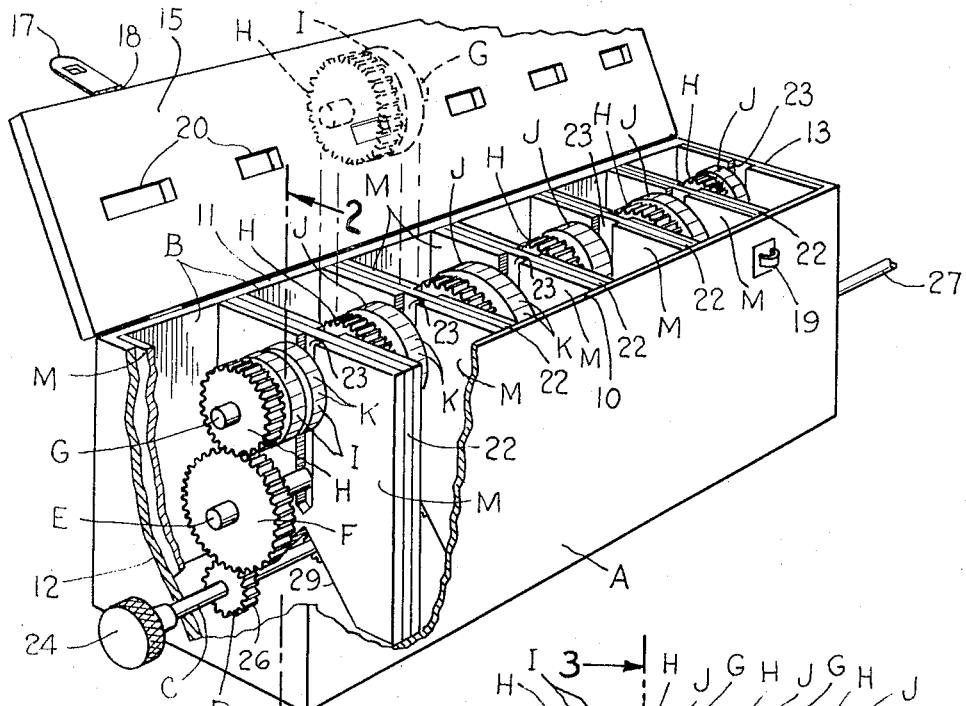

Feb. 28, 1967  N. A. PRICE, JR  3,305,958
PRODUCTION CONTROL DEVICE
Filed April 29, 1965  3 Sheets-Sheet 1

INVENTOR.
N. A. PRICE, JR.
BY
ATTORNEY

Feb. 28, 1967  N. A. PRICE, JR  3,305,958
PRODUCTION CONTROL DEVICE
Filed April 29, 1965  3 Sheets-Sheet 2

INVENTOR.
N. A. PRICE, JR.
BY
ATTORNEY

Feb. 28, 1967     N. A. PRICE, JR     3,305,958

PRODUCTION CONTROL DEVICE

Filed April 29, 1965                 3 Sheets-Sheet 3

SPINNING DOFF SCHEDULE
SECOND SHIFT
Date _____
Scheduled By _____

| PERIOD | TIME | YARN AND FRAME ||||
| | | N 30 | O 48 | P 15 | Q 60 |
|---|---|---|---|---|---|
| 1 | 4:00 | | | | |
| 2 | 12 | 51 | | 84 | |
| 3 | 24 | 52 | 72 | | 89 |
| 4 | 36 | | | | |
| 5 | 48 | 53 | | 85 | 90 |
| 6 | 5:00 | | | | |
| 7 | 12 | 54,55 | 73 | | 91 |
| 8 | 24 | | | 86 | |
| 9 | 36 | 56 | | | |
| 10 | 48 | | 74 | 87 | |
| 11 | 6:00 | 57,58 | | | |
| 12 | 12 | 59 | | | 93 |
| 13 | 24 | | | 88 | |
| 14 | 36 | 71,61 | 75 | | 94 |
| 15 | 48 | 62 | | | |
| 16 | 7:00 | | | | |
| 17 | 12 | 63 | | 84 | |
| 18 | 24 | | 76 | | 95 |
| 19 | 36 | | | | |
| 20 | 48 | 64 | 77 | 85 | |
| 21 | 8:00 | | | | |
| 22 | 12 | 65 | | | 96 |
| 23 | 24 | | | 86 | |
| 24 | 36 | 66 | | | |
| 25 | 48 | 67 | | 87 | |
| 26 | 9:00 | | 78 | | 97 |
| 27 | 12 | 68 | | | 98 |
| 28 | 24 | | 79 | 88 | |
| 29 | 36 | | | | |
| 30 | 48 | 69,70 | | | |
| 31 | 10:00 | | | | 99 |
| 32 | 12 | 51 | | 84 | |
| 33 | 24 | 52 | 80 | | |
| 34 | 36 | | | | |
| 35 | 48 | 53 | 81 | 85 | 100 |
| 36 | 11:00 | | | | |
| 37 | 12 | 54,55 | | | |
| 38 | 24 | | 82 | 86 | 101 |
| 39 | 36 | 56 | 83 | | |
| 40 | 48 | | | 87 | |

| Jones DOFFER Second Shift Date |||| Smith DOFFER Second Shift Date |
|---|---|---|---|---|
| DOFFS | TIME | FRAME NO. | TIME | FRAME NO. |
| Ø 1 | 4:00 | 51 | 4:00 | |
| 2 | 12 | 84 | 12 | 89 |
| 3 2 | 24 | 52 | 24 | 72 |
| Ø 1 | 36 | | 36 | 90 |
| 3 2 | 48 | 53 | 48 | 85 |
| Ø 2 | 5:00 | 73 | 5:00 | 91 |
| 4 2 | 12 | 54 | 12 | 55 |
| 1 | 24 | 86 | 24 | |
| 1 | 36 | | 36 | 56 |
| 2 | 48 | 74 | 48 | 87 |
| 2 | 6:00 | 57 | 6:00 | 58 |
| 2 | 12 | 59 | 12 | 93 |
| ✗ 2 | 24 | 88 | 24 | 94 |
| 4 2 | 36 | 71 | 36 | 61 |
| ✗ 2 | 48 | 62 | 48 | 75 |
| 0 | 7:00 | | 7:00 | |
| 2 | 12 | 63 | 12 | 84 |
| 2 | 24 | 76 | 24 | 95 |
| Ø 1 | 36 | 77 | 36 | |
| 3 2 | 48 | 64 | 48 | 85 |
| 0 | 8:00 | | 8:00 | |
| 2 | 12 | 65 | 12 | 96 |
| 1 | 24 | | 24 | 86 |
| 1 | 36 | 66 | 36 | |
| 2 | 48 | 67 | 48 | 87 |
| 2 | 9:00 | 78 | 9:00 | 97 |
| 2 | 12 | 68 | 12 | 98 |
| 2 | 24 | 79 | 24 | 88 |
| 0 | 36 | | 36 | |
| 2 | 48 | 69 | 48 | 70 |
| 1 | 10:00 | | 10:00 | 99 |
| 2 | 12 | 51 | 12 | 84 |
| 2 | 24 | 52 | 24 | 80 |
| Ø 2 | 36 | 81 | 36 | 100 |
| 4 2 | 48 | 53 | 48 | 85 |
| Ø 1 | 11:00 | 55 | 11:00 | |
| 2 | 12 | 54 | 12 | 101 |
| 3 2 | 24 | 82 | 24 | 86 |
| 2 | 36 | 56 | 36 | 83 |
| 1 | 48 | | 48 | 87 |
| 64 | | | | |

*Fig. 6.*

INVENTOR.
N. A. PRICE, JR.
BY *[signature]*
ATTORNEY

United States Patent Office 3,305,958
Patented Feb. 28, 1967

3,305,958
PRODUCTION CONTROL DEVICE
Nathan A. Price, Jr., Greenville, S.C., assignor to Henderson, Lindsay & Michaels, Inc., Greenville, S.C., a corporation of South Carolina
Filed Apr. 29, 1965, Ser. No. 451,913
4 Claims. (Cl. 40—68)

This invention relates to production control devices and more particularly to a device for programming the operation of a large group of machines especially useful for but not limited to textile machines.

One of the problems in a large industry, where there are a great many periodic or cyclic events that must be attended to by personnel, is programming these events so as to obtain the maximum efficiency of the available personnel. This is a particular problem in the textile industry where many machines of like character are attended by a limited number of operators. For example, in the manufacture of spun yarn there is the problem of coordinating the activities of a limited number of doffers or unloading personnel with the various running cycles of many spinning frames or machines. If sufficient doffers are employed to avoid idle machine time, such as may result if a number of machines become ready for doffing at the same time without sufficient personnel to promptly tend the machines, doffing labor cost may be excessive because there may also be times when few if any machines are ready for doffing resulting in idle personnel. If frames must remain unattended for substantial period awaiting doffing, yarn production is reduced and overhead is excessive.

Management attempts to schedule frame doffing where practical to avoid both of these undesirable situations. However, where there are a number of different styles of yarn being run on different machines and, therefore, a number of different machine running cycles, the cost of compiling schedules with traditional clerical methods is high and the chance of costly error is great.

Accordingly, it is an important object of the present invention to provide a simple method and device for coordinating the activities of personnel requiring various intervals of time with various machine running or operating cycles, or with recurring events.

Another object of this invention is to provide a compact device for determining in advance, for any given time in a work shift, machines that will require tending for production programming purposes.

Still another object of this invention is to provide means for determining the most desirable time during a shift to schedule the commencement of operation of a machine.

Still another object of this invention is to provide a production control device which is versatile in that it can program the operation of a large group of machines having different intervals of time required for carrying out an operational event. This is accomplished by providing certain assemblies that can be readily changed to accommodate the device for the different intervals of time required for carrying out an operational event.

Another object of this invention is to provide a simple production control device which would require a minimum of operator training for proper use thereof.

Figure 2:
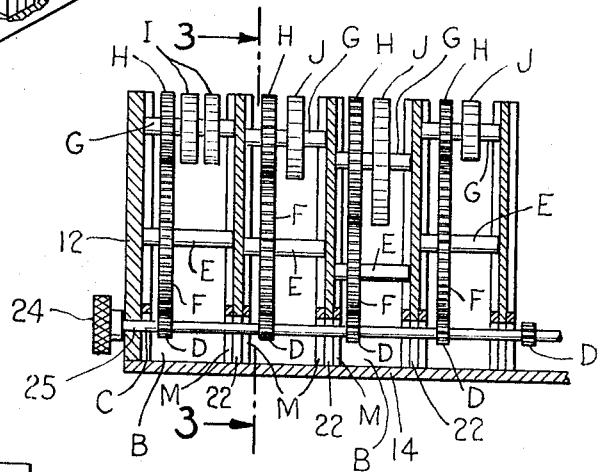
Figure 3:
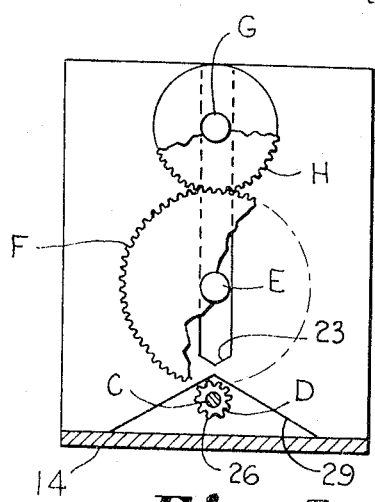
Figure 4:
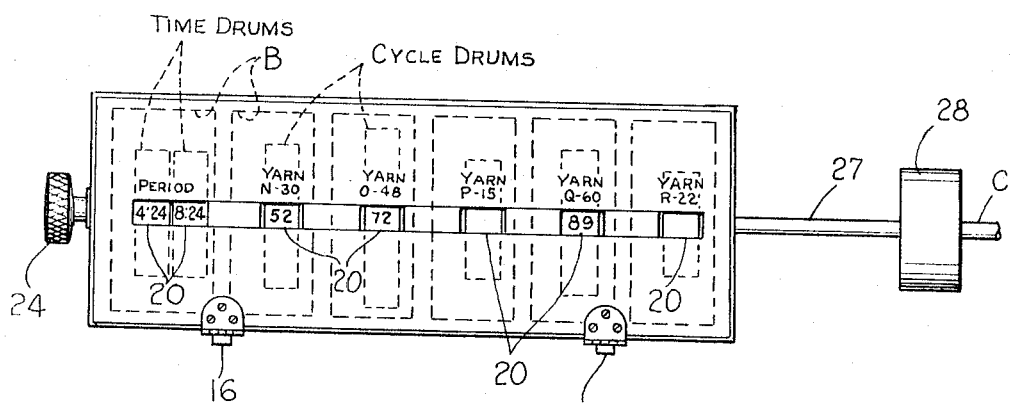
Figure 5:
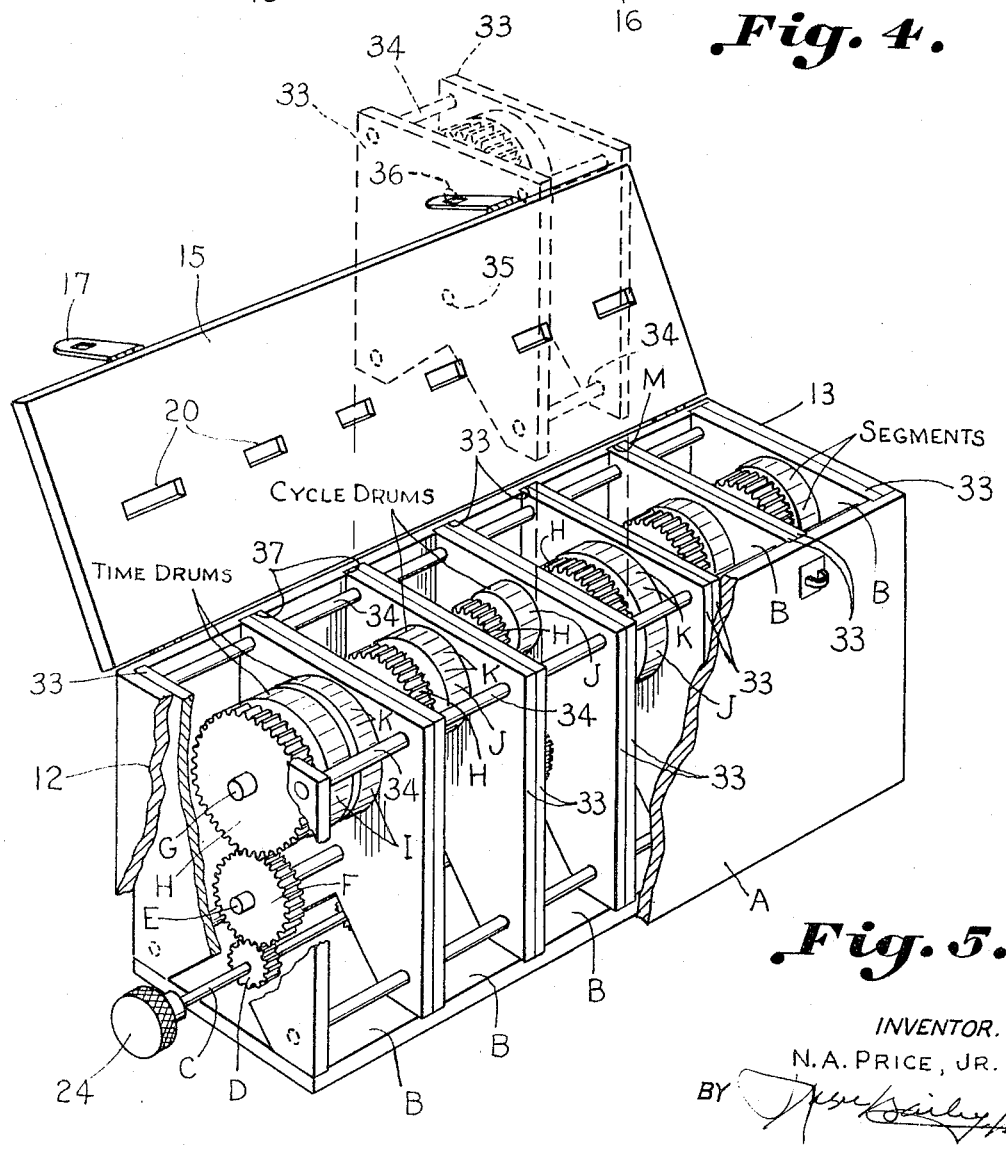

The invention will be more readily understood from a reading of the following specification and by reference to the accompanying drawings forming a part thereof, wherein an example of the invention is shown and wherein:

FIGURE 1 is a perspective view illustrating a production control device constructed in accordance with the invention, with parts broken away for clarity of illustration, FIGURE 2 is a longitudinal sectional elevation illustrating a portion of a gear assembly taken on the line 2—2 in FIGURE 1, FIGURE 3 is a transverse sectional elevation, at an enlarged scale, taken on the line 3—3 in FIGURE 2, further illustrating the gear assembly with parts broken away, FIGURE 4 is a plan view further illustrating the production control device shown in FIGURE 1, FIGURE 5 is a perspective view illustrating a production control device constructed in accordance with a modified form of the invention, with parts broken away to show a gear assembly, and FIGURE 6 illustrates a programming schedule such as may be produced using a device constructed in accordance with the invention.

The drawings illustrate a production programming device including an elongated container A. A plurality of transverse partitions are carried in said container dividing the container into a series of compartments B. A first longitudinal shaft C is carried for rotation in the container and extends across the container through the compartments. A first gear D is mounted on the first shaft in each compartment. A second shaft E is carried for rotation in each compartment. A second intermediate gear F is carried by each second shaft and is driven by a respective first gear. A third shaft G is carried in each compartment. A third gear H is carried on each third shaft and is driven by a respective intermediate gear. A time drum I is carried on the third shaft in one of the compartments. Cycle drums J are carried for rotation on the third shaft in other compartments. Guide means M are located within each compartment for positioning said respective second and third shafts and gears and drums within the container for removal therefrom by lifting same from the guide means. Segments K of equal length designating equal intervals of time for an operational event, such as a service or doffing time of a machine, are carried about the surface of the time drums I and the cycle drums J. The time drum is so sized as to accommodate the segments representing a predetermined work period successively about its entire surface. The cycle drums J are so sized as to accommodate the segments successively representing the elapsed time between reoccurring operational events of a given production unit about its entire surface. Indicia is carried by the segments on the time drum indicating relative time during the work period. Indicia is carried on the segments on a cycle drum designating production units or machines having equal elapsed time between reoccurring operational events. Indicia carried by the segments of another cycle drum may designate production units having a different elapsed time between such reoccurring operational events. The indicia on the drums is shown only in FIGURE 4 through viewing windows. Such indicia on the time drum corresponds to the indicia under the column marked "Time" on the spinning doff schedule shown in FIGURE 6. The indicia on the first four cycle drums corresponds to the indicia under the columns N, O, P and Q of FIGURE 6, respectively. For example, the cycle drum from which the information under column N of FIGURE 6 was taken has thirty successive segments and the indicia thereon corresponds to the first thirty periods of column N. The indicia of column O corresponds to indicia of the second cycle drum except that the indicia on all the segments of the second cycle drum is not represented, since the schedule only shows forty periods and the second cycle drum has 48 periods or sections. The machines of periods 41 through 48 will come up for doffing during the next shift.

The invention contemplates rotating the timing drums and the cycle drums simultaneously so that the same number of segments pass a reference means on each cycle drum as pass the reference means on the time drum. The indicia on the time drum indicate elasped time, and the indicia or numbers on the cycle drums indicate the machine on which an operational event is to take place. For example, if the production control device is used in a textile mill where there are a large number of spinning frames or machines having different running times, then the arc length of the segments on the drums represents the doffing time or unloading time for a frame. The size of the time drum would depend on the work period that it is to represent. If the period is four hours and the average time to doff a machine is 12 minutes, then the periphery of the drum would be divided into 20 sections, each representing 12 minutes of time.

The cycle drums are divided into sections or segments, each section being the same size as the sections on the timing drum. The number of sections usually varies from one cycle drum to another because the size of the drums varies as described below. The circumferences of the cycle drums represent the time elapsed during a running cycle of a particular machine. A running cycle is the running time of the machine plus the time necessary to doff the machine. Therefore, if the running time for a machine is two hours or 120 minutes, and the doff or service time is 12 minutes, a drum having a circumference equal in size to 13 sections would be required.

All machines having a common running cycle are preferably, where space permits, represented on the same cycle drum, and numbers representing the machines for identification purposes are placed in the segments or sections around the periphery of the drum.

Thus, by rotating the time drums and the different size cycle drums, through proper gear assemblies, simultaneously by means of a common drive shaft C, at different angular rates and at the same peripheral velocity, the same number of sections on each drum will pass a viewing area in a given time. However, for a given number of segments or sections, one drum may rotate through 360 degrees while another rotates through 180 degrees.

As can be seen, two important features of this preferred embodiment of the invention are: Cycle drums that have segments on their periphery that correspond to the running cycle of the machines that they represent, and proper gear combinations so as to rotate the drums at the same peripheral velocity. In the examples illustrated herein, the number of teeth on the respective gear combinations associated with each respective drum is equal to the number of teeth of the respective gear combinations of each of the other drums.

From this it can be seen that by rotating the timing drum through a given period of time, such as a work shift, and simultaneously rotating the cycle drums at the same peripheral velocity, the numbers on the cycle drums would indicate the machines that would require doffing during that period of time and the particular time that each should be doffed.

Each time a cycle drum makes a complete revolution, all of the frames that are represented thereby will require doffing once. Therefore, if a cycle drum makes three complete revolutions during the given time period, then every frame that is represented by the cycle drum would require doffing three times. The particular time that the frames require doffing would be indicated by indicia representing relative or elapsed time on the timing drum. As all of the drums pass a reference point, such as a viewing window, the indicia on the section of the timing drum would indicate the time of day. The indicia on the sections of the cycle drums would indicate the frames that require doffing at that time.

Thus, by rotating the time drum through a period of time for which the operation of the frames are to be coordinated, then the frames that require doffing and the time that the doffing is to take place is indicated.

From this information the operation of all the machines in the mill can be coordinated to obtain from the available personnel maximum efficiency in doffing the machines. For example, if a proposed production schedule is such that more frames require doffing at a given time during a shift than available operators can properly handle, the scheduling of commencing operation of a machine may be changed, or the scheduling for doffing a particular machine may be changed. This is accomplished by shifting the indicia representing the frames to sections on the cycle drum that are not occupied (see FIGURE 6). Normally, it is best to doff a machine early rather than late so as to avoid idle machines and obtain maximum yarn production.

Referring more particularly to the drawings, the elongated container A has rectangular front and rear sides 10 and 11, respectively, joined by two rectangular ends 12 and 13. A base or bottom closure 14 connects the sides and ends to define a rectangular container. A top 15 is fastened to the rear side 11 by a pair of hinges 16. This enables the top to be opened so that the drums and gear assemblies can be readily removed by simply lifting them out of the container. A pair of hasps 17, only one being shown, are suitably fastened to the top as by hinges 18 so that when the top is closed the hasp will pass over staples 19, only one being shown, and secured by a pin, pad lock, or the like (not shown). The container may be constructed of wood or of any other suitable material.

In the top 15 there are viewing windows 20 which are aligned to provide a common reference for the drums when the top is in a closed position. In the preferred embodiment illustrated, the width of the windows correspond to the size of the sections on the drums for allowing one section to be seen at a time. If it is desired, a single viewing window that extends the entire longitudinal distance of the drums may be used instead of the plurality of windows shown in FIGURE 1.

The container (FIGURES 1 through 4) is divided into a series of compartments B by vertical dividers 22. These dividers are fixed securely between the sides 10 and 11 so as to hold the guide means M in proper position.

The guide means M are positioned flush up against the dividers and may be secured to the dividers by glue, screws or the like (not shown). A vertical groove 23 is cut in the upper medial portion of the guide for carrying intermediate shaft E and upper shaft G. In order that the gear assemblies which includes the shafts E and G and their respective gears can be readily changed, the top of the groove 23 is open. When the top of the container is in the open position, as shown in FIGURE 1, the gear assemblies can be removed simply by lifting, as shown by the dotted lines. This enables other drums and gears which represent machines having a different running cycle to be substituted therefor. Thus, the relatively small production control device can be used to program the operation of a large group of machines having a variety of running cycles by merely changing the units.

The width of the grooves is such that shafts E and G are supported for free rotation therein. In order that different size gears can be used, the groove extends far enough down the medial portion of the guide to enable a relatively small intermediate gear to be in mesh relation with drive gear D. A cut out portion 29 of the lower medial area of the guide means M allows the drive shaft to extend across the container.

The longitudinal shaft C has a knurled knob 24 on one end for rotating the shaft. The shaft is journaled in openings 25 in the ends 12 and 13 of the container. One of the openings can be seen in end 12 of FIGURE 2. Since the shaft may be rotated by hand, bearings are not deemed necessary in the openings 25, but if it is desired they may be used. Drive shaft end 27 extends out of end 13 of the container so that it can be coupled to the drive shaft C of another production control device. The two drive shafts are coupled together by the coupling means 28 (see FIGURE 4) which could be any conventional coupler that is capable of coupling two shafts together. Sometimes when a large group of machines are to be programmed it is desirable that two or more production control devices be coupled together.

A first gear D is mounted on shaft C in each compartment and gear teeth 26 are carried on the periphery of the gear. The teeth can be of any standard size and in the preferred embodiment there are twelve teeth on the drive gear D. The gears can be glued to the shafts, keyed or fastened thereon in any desirable manner. It is noted that each of the gears D are identical, therefore, when drive shaft C is rotated the gears will drive the intermediate gear D at the same peripheral velocity.

Since the teeth of the gears are on the perimeter of the gears, all of the gears and drums rotate at the same peripheral velocity, but the angular rates of rotation of the intermediate gear F and the upper gear H in each compartment may vary. The size of the teeth on the intermediate gear and the upper gear correspond to those on the drive gear D. The total number of teeth on the intermediate gear and the upper gear of a gear assembly is equal to the total number of teeth of the intermediate gear and the upper gear of any other gear assembly. It is desirable to keep the total number of teeth of the gear assemblies equal. By doing this the total diameter of the two gears are equal to the diameter of the gear assemblies of the other units and the uppermost teeth on the upper gears H are in the same longitudinal plane. Since the drums are the same size as their respective upper gear, the uppermost segments on the drums are in the same plane adjacent the viewing windows. This enables the indicia on the segments of the drums to be clearly visable through the windows.

In one embodiment the upper gear has two teeth for each section of the drum and the total number of teeth of the upper gear H and the intermediate gear F is 132. If the number of sections on the periphery of the time drum is 20, then the number of teeth on the upper gear H would be 40. Since all of the gear combinations of this particular embodiment have 132 teeth, the intermediate gear would have 92 teeth.

Selecting the proper gears for the gear assemblies which drive the cycle drums J would be performed in the manner outlined above. Once the number of sections on the drums is calculated it becomes merely a matter of determining the gear ratios for the respective intermediate gears F and the upper gears H.

First, referring to the timing drums I, such are divided into a plurality of sections, the total number of which on both drums will be equal to the total number of service periods or doffing times (time required for doffing a machine) that are possible in a given period of time; for example, in an eight hour shift. The doffing times for various spinning frames, depending on the number and type of spindles, and the style of yarn being run, usually fall near enough to 5, 6, 7½, or 10 minutes for pair doffing, or 10, 12, 15 or 20 minutes for single doffing to consider these to be the doffing times for scheduling purposes. The invention will be described assuming that the machines and yarn style call for a doff period of 12 minutes. Therefore, in determining the number of sections to be marked off on the two time drums I, the doff time is divided into the total number of minutes in an eight-hour shift, which comes to 40. In order that the spaces or or sections necessary for an eight hour shift be represented on the time drum so that easy reading can take place, two time drums are used, both of which are divided into twenty sections. Assuming that the shift that is being programmed starts at 4:00 o'clock P.M., then the spaces on the first time drum I would be calibrated 4:00, 4:12, 4:24, etc., for twenty periods. The second time drum I would be calibrated 8:00, 8:12, 8:24 for twenty periods. The indicia under the column marked "Time" of FIGURE 6 corresponds to the indicia on the time drums. Thus, by rotating the time drums two revolutions, during the first revolution observing the first time drum I, then on the second revolution observing the second time drum, the time drums would traverse the represented time equivalent to an eight hour shift. It is to be noted that a single drum could be used to represent an eight hour shift or any desired period of time as long as the cycle drums have the same size sections thereon. Moreover, it may be necessary to use a different doff period than 12 minutes, depending on machine and yarn style. If a doff period of 10 minutes were used, then 48 periods or sections would be required on the time drum, and for a 15-minute doff time only 32 would be needed.

Referring now to the indicia on the cycle drums J, the cycle drums have sections K thereon equal in size to the segments or sections K on the time drum, but the number of sections on the cycle drums is not usually the same as the number of sections on the time drums. Normally, each of the cycle drums have a different number of sections thereon, and the number depends on the required run time of a machine plus the required doff time. The number of sections for a particular cycle drum is determined by adding the run time of the machine plus the doff time (this is the running cycle for the particular machine) and dividing by the doff time. For the four types of yarn, N, O, P and Q represented in FIGURE 6, it is assumed that the number of sections required on the drums would be 30, 48, 15 and 60, respectively. Since for every revolution of a cycle drum, a particular machine represented on a section on a cycle drum would need doffing or servicing once, a number of machines having the same running cycle can be represented on the same cycle drum. For example, in FIGURE 6, the cycle drum which corresponds to yarn N has 30 sections thereon, and represents machines 51, 52, 53, 54, 55, 56, 57, 58, 59, 71, 61, 62, 63, 64, 65, 66, 67, 68, 69 and 70.

The actual spacing or marking of machine numbers in the sections around the periphery of the cycle drums is usually done with strips of printed tape that can be removed and replaced when machines or frames are rescheduled. These machine numbers are spaced around the cycle drum so that the times for doffing the machines are spaced throughout the work shift. If all the machines had the same operating cycle, there would be less difficulty in programming the machines. However, when the operating cycles of the machines vary there arises a problem of coordinating the times for doffing the different machines. These machines may be coordinated by placing the numbers of all the machines having common operating cycle on the same cycle drum. By simultaneously rotating all of the drums, the times during a shift when the various machines need doffing will be indicated.

In the particular embodiment of the invention illustrated, two teeth on the upper gears correspond to a section on the drums. By turning knob 24 drive gear D will be rotated. If drive gear D is rotated four teeth, then all of the upper gears will be rotated four teeth. The angular displacement of the upper gears is different, but the arc distance traversed by a point on the perimeter of the upper gears or drum will be the same for all the upper gears and drums.

FIGURE 4 shows the top 15 of the container with the viewing windows 20 therein. Through the viewing windows a section of each of the cycle drums may be seen and above the viewing windows indicia representing the particular yarn being run and the number of sections on the respective cycle drum may be placed.

*Operation*

In describing the operation of the invention reference is made to the programming schedule of FIGURE 6, as well as the embodiments of the invention shown in FIGURES 1 through 4. Before the operator can use the device for programming the operation of the frames or machines, drums having the proper sections corresponding to doff time requirements must be selected. As previously described, if the machines to be programmed have a service time or doff time of 12 minutes, then two timing drums divided into a total of 40 sections, 20 for each drum, are selected. The gear ratio of the intermediate gear F and the upper gear H is such that for every two teeth the upper gear is rotated the timing drums I are rotated one section representing a doff period of twelve minutes.

Each of the cycle drums is also rotated one section when the timing drum is rotated one section. Therefore, the cycle drums indicate the machines that require doffing and the indicia on the timing drums I indicate the time when such operation will take place.

When the operator desires to program the machines for an eight hour period the drums I would be rotated twice. As the sections on the timing drums pass the viewing window 20 the time for doffing will be indicated and the operator records this information under the column marked "Time" on a schedule similar to that shown in FIGURE 6. The indicia on the cycle drums will indicate the frames that require doffing and this information is recorded under the column identifying frames as shown in FIGURE 6.

After the programmer records all of the indicia indicated by the time drums and cycle drums for a given period of time on a doff spinning schedule, he then must shift the doffing time for some of the machines.

The doffing of the frames shown in the columns N, O, P and Q in FIGURE 6, is to be performed by two doffers. The maximum number of frames that they can doff in a period of time shown under the column marked "Period" and the column marked "Time" is two. Referring to the column marked "Doffs" it can be seen that prior to rescheduling of the doffing times of the frames, during some periods of time more than two frames come up for doffing. For example, at the time of 5:12 or period 7, frames 54, 55, 73 and 91 come up for doffing. The scheduler totals the number of these frames and writes a 4 in column marked "Doffs." Since the two available doffers cannot doff four frames during the period, it is necessary that the doffing time of two of the frames be shifted or rescheduled. In this case, the doffing time for frames 73 and 91 are changed as indicated by the arrows to the doffing period 6. Originally, there were no frames scheduled to be doffed at 5:00, but after rescheduling the doffing time, frames 73 and 91 will be doffed at 5:00 and frames 54 and 55 will be doffed at 5:12.

*Modified device*

FIGURE 5 shows a production control device constructed in accordance with a modified form of the invention. The production control device is substantially the same as that of FIGURE 1 with the exception of the construction of the compartments or assemblies accommodated therein. In this embodiment of the invention, the intermediate shaft E and the upper shaft G of each assembly are rotatably mounted between two parallel frame members 33. These frame members are fastened together by dowel pins 34 to enable the removal of an entire compartment comprising the intermediate gear and the associated upper gear and drum.

The shaft E is journaled for rotation between a pair of apertures 35 shown in dotted lines in frame members 33 of the removed assembly. The shaft G is journaled for rotation between a pair of apertures 36 shown in dotted lines in frame members 33 in the removed assembly.

In order that the assemblies can be readily changed guide means M includes vertical guide grooves 37 cut into the front and back sides 10 and 11 of the container. These grooves are wide enough to accommodate two frame members so that they may be removed therefrom. The grooves 37 may not be necessary since the frame members and the sides of the compartment may serve as guide means. The assemblies may be placed successively in the compartment and guided by the sides of the compartments and the frame members.

In the embodiment of the modified form of the invention the operation is the same as that already described, except that an entire assembly is changeable as a unit.

It may be desired to synchronize the rotation of the timing drums with the passage of time during the day so as to indicate at any particular time during the day the frames that require doffing. This could be accomplished by connecting a synchronizing motor to the drive shaft in order to rotate the time drum once in the time period that the indicia on the time drum represents.

While a preferred embodiment of the invention has been described using specific terms, such description is for illustrative purposes only, and it is to be understood that changes and variations may be made without departing from the spirit or scope of the following claims.

What is claimed is:

1. A production programming device including, an elongated container, a plurality of transverse partitions in said container dividing the container into a series of compartments, a first longitudinal shaft carried for rotation in said container extending across the container through the compartments, a first gear carried by said first shaft in each compartment, a second shaft carried for rotation in each compartment, a second intermediate gear carried by each second shaft driven by a respective first gear, a third shaft carried in each compartment, a third gear carried on each third shaft driven by a respective intermediate gear, a drum carried by each third shaft, the sum of the diameter of the second and third gears of each compartment being equal, the diameter of the drums being equal to the diameter of the corresponding third gear in each compartment, indicia carried by at least one of said drums calibrating same in units of time, indicia carried by the other of said drums calibrating same in units of production events, said gears being sized to correspond to the indicia, the diameter of the drums which have indicia thereon representing units of production events being different, a viewing means adjacent said drums, and guide means positioning said respective second and third shafts and gears and drums carried thereby within the container for removal therefrom by lifting same from said guide means.

2. A simulating device for scheduling the happening of operational events during a given period of time comprising: an elongated container; a viewing means carried by the container; means dividing the container into a plurality of sections; a common drive shaft mounted for rotation extending across the container; a drive gear coupled to said common drive shaft within each section; a second intermediate gear rotatably mounted within each of said sections in meshed relationship with a respective drive gear; a third gear rotatably mounted within each of said sections in meshed relationship with a respective intermediate gear; a drum coupled to each of said third gears; indicia carried on one of said drums representing time segments for a given period; indicia carried on the other drums representing operational events; the sum of the diameter of the corresponding third gear in each section; being equal; the diameter of the drums being equal to the diameter of the corresponding third gear in each section; the diameter of the drums which are calibrated in units of production events being different; and the gear ratio of the respective intermediate gears and third gears being so selected that when the drive shaft is rotated the drums representing time will be shifted through a given period, and the other drums will be shifted a corresponding amount so as to expose to the viewing means the operational events that will take place during the given time period.

3. A production programming device comprising: an elongated container having a longitudinal viewing area therein; a plurality of partitions disposed in said container for dividing said container into sections; a common drive shaft rotatably mounted across said container; a drive gear coupled to said common drive shaft within each section; each section comprising a pair of frame members mounted on opposite sides of the section, a vertical open topped receiving groove carried by each of said frame members, an intermediate shaft removably and rotatably disposed between the grooves of a pair of frame members, an intermediate gear coupled to said intermediate shaft in meshed relationship with the drive gear in that section, a third shaft removably and rotatably disposed between the grooves of the pair of frame members, a third gear coupled to said third shaft in meshed relationship with said intermediate gear, and a drum coupled to said third shaft for simultaneous rotation with said third gear; indicia angularly spaced on the drum of one of said units representing given periods of time; indicia angularly spaced on the drums of the other units representing operational events; the diameter of the drums which have indicia thereon representing operational events being different; and means for rotating said drive shaft which in turn rotates the drums through the intermediate gears and the third gears so that as the drum having indicia representing time thereon is rotated through a given period of time, the other drums having indicia representing operational events will indicate the operational events that take place during the given time period.

4. A production programming device comprising: an elongated container having a longitudinal viewing area therein; a plurality of assemblies removably disposed within said container so that the assemblies can be readily changed and others substituted therefor; a common drive shaft journaled in said container; a plurality of drive gears carried by said drive shaft so that each of said assemblies has a drive gear therefor; each of said assemblies comprising a pair of parallel frames, a second longitudinal shaft carried for rotation between said parallel frames, a second gear carried on said second shaft in meshed relationship with a respective drive gear, a third longitudinal shaft carried for rotation between said parallel frames, a third gear carried on said third shaft in meshed relationship with said second gear, and a drum carried on said third shaft; indicia carried on at least one of the drums calibrating same in units of time; indicia carried by the other of said drums calibrating same in units of production events; the diameter of the drums which have indicia thereon representing operational events being different; and means for rotating said drive shaft which in turn rotates the drums through the intermediate gears and the third gears so that as the drum having indicia representing time thereon is rotated through a given period of time, and the other drums having indicia representing operational events indicate through the viewing area the operational events that take place during the given time period.

References Cited by the Examiner

UNITED STATES PATENTS 3,169,331  2/1965  Herster _____ 116—133 X

FOREIGN PATENTS 283,722  12/1928  Great Britain.
488,210  7/1938  Great Britain.

JEROME SCHNALL, *Primary Examiner.*